United States Patent
Dettinger et al.

(10) Patent No.: US 10,394,537 B2
(45) Date of Patent: Aug. 27, 2019

(54) EFFICIENTLY TRANSFORMING A SOURCE CODE FILE FOR DIFFERENT CODING FORMATS

(71) Applicant: International Business Machines Corporation, Armonk, NY (US)

(72) Inventors: Richard D. Dettinger, Rochester, MN (US); Brian E. Olson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 15/402,560

(22) Filed: Jan. 10, 2017

(65) Prior Publication Data
US 2018/0196651 A1   Jul. 12, 2018

(51) Int. Cl.
*G06F 9/44* (2018.01)
*G06F 8/51* (2018.01)
*G06F 8/71* (2018.01)
*G06F 16/11* (2019.01)

(52) U.S. Cl.
CPC .............. *G06F 8/51* (2013.01); *G06F 8/71* (2013.01); *G06F 16/116* (2019.01)

(58) Field of Classification Search
CPC ........ G06F 17/30076; G06F 8/33; G06F 8/51; G06F 8/70; G06F 8/427
See application file for complete search history.

(56) References Cited

U.S. PATENT DOCUMENTS

| 5,293,629 | A | 3/1994 | Conley et al. | |
|---|---|---|---|---|
| 7,624,385 | B2 | 11/2009 | Waddington et al. | |
| 9,471,304 | B1* | 10/2016 | Fuchs | G06F 8/71 |
| 2003/0187656 | A1 | 10/2003 | Goose et al. | |
| 2007/0011654 | A1* | 1/2007 | Opperman | G06F 8/70 717/122 |
| 2008/0196015 | A1* | 8/2008 | Bekelman | G06F 8/10 717/143 |
| 2008/0216060 | A1* | 9/2008 | Vargas | G06F 8/51 717/137 |
| 2008/0229290 | A1* | 9/2008 | Jones | G06F 8/33 717/137 |
| 2016/0350084 | A1* | 12/2016 | Waggoner | G06F 8/34 |
| 2017/0109139 | A1* | 4/2017 | Bitner | G06F 8/33 |

OTHER PUBLICATIONS

Gray et al., "Software forensics: Extending authorship analysis techniques to computer programs." University of Otago, The Information Science Discussion Paper Series, Dec. 1997, 10 pages.

(Continued)

*Primary Examiner* — Duy Khuong T Nguyen
(74) *Attorney, Agent, or Firm* — Richard Wilhelm; Edell, Shapiro & Finnan, LLC (57) ABSTRACT

A source code file is generated in accordance with a first coding format employed by a first user. In response to a request for the generated source code file from a second user employing a different coding format, the generated source code file is transformed to the different coding format employed by the second user, and the transformed source code file is presented to the second user in the different coding format.

9 Claims, 8 Drawing Sheets

(56) References Cited

OTHER PUBLICATIONS

Mamas et al., "Towards portable source code representations using XML." Reverse Engineering, 2000. Proceedings. Seventh Working Conference on. IEEE, 2000, 11 pages.
Terceiro et al. "Analizo: an extensible multi-language source code analysis and visualization toolkit." Brazilian conference on software: theory and practice (Tools Session), 2010, 6 pages.
Aguiar et al., "JavaML 2.0: Enriching the markup language for Java source code." XML: Aplicagoes e Tecnologias Associadas 2004 (2004): pp. 1-12.
Clark, "XSL Transformations (XSLT)", W3C, (1999), 51 pages.
Frantzeskou et al. "Identifying authorship by byte-level n-grams: The source code author profile (scap) method." International Journal of Digital Evidence 6.1 (2007): pp. 1-18.

\* cited by examiner

EFFICIENTLY TRANSFORMING A SOURCE CODE FILE FOR DIFFERENT CODING FORMATS

BACKGROUND

1. Technical Field

Present invention embodiments relate to code formatting, and more specifically, to efficiently transforming a source code file for different coding formats.

2. Discussion of the Related Art

Few, if any, computer programmers have identical preferences as to the structure of source code. As a result, when a subsequent programmer attempts to modify source code that was written or modified by a previous programmer, the subsequent programmer must work with source code that is not written to their preferences. This can cause a programmer to work less efficiently because, for example, the subsequent programmer may not be familiar with the previous programmer preferences. Further, the subsequent programmer may spend additional time adjusting the source code to that programmer's preferences.

One approach to addressing these issues is a beautification mandate, which is a set of standardized preferences that a team of computer programmers is expected to follow. However, programmers often disobey/ignore beautification mandates. When even a single programmer in a team refuses to follow the beautification mandates, the document no longer conforms to the set of standardized preferences. Even if every programmer on the team follows the beautification mandate, the team may work sub-optimally in order to comply with that mandate.

SUMMARY

According to one embodiment of the present invention, a method of transforming a source code file for different coding formats includes generating a source code file in accordance with a first coding format employed by a first user. In response to a request for the generated source code file from a second user employing a different coding format, the generated source code file is transformed to the different coding format employed by the second user. The transformed source code file is presented to the second user in the different coding format.

BRIEF DESCRIPTION OF THE DRAWINGS

Generally, like reference numerals in the various figures are utilized to designate like components.

DETAILED DESCRIPTION

Present invention embodiments transform a source code file for different coding formats. A source code file is generated in accordance with a first coding format employed by a first user (e.g., a first user may prefer to place commas or brackets at particular locations in the source code). In response to a request for the generated source code file from a second user employing a different coding format, the generated source code file is transformed to the different coding format employed by the second user. For example, the second user may prefer to place commas or brackets at particular locations in the source code that are different from the first user particular locations. In this example, the transformed source code and generated source code are functionally equivalent, but commas and brackets in the transformed source code are in different locations from those in the generated source code. The transformed source code file is presented to the second user in the different coding format (e.g., in accordance with the format preferred by the second user).

Figure 1:
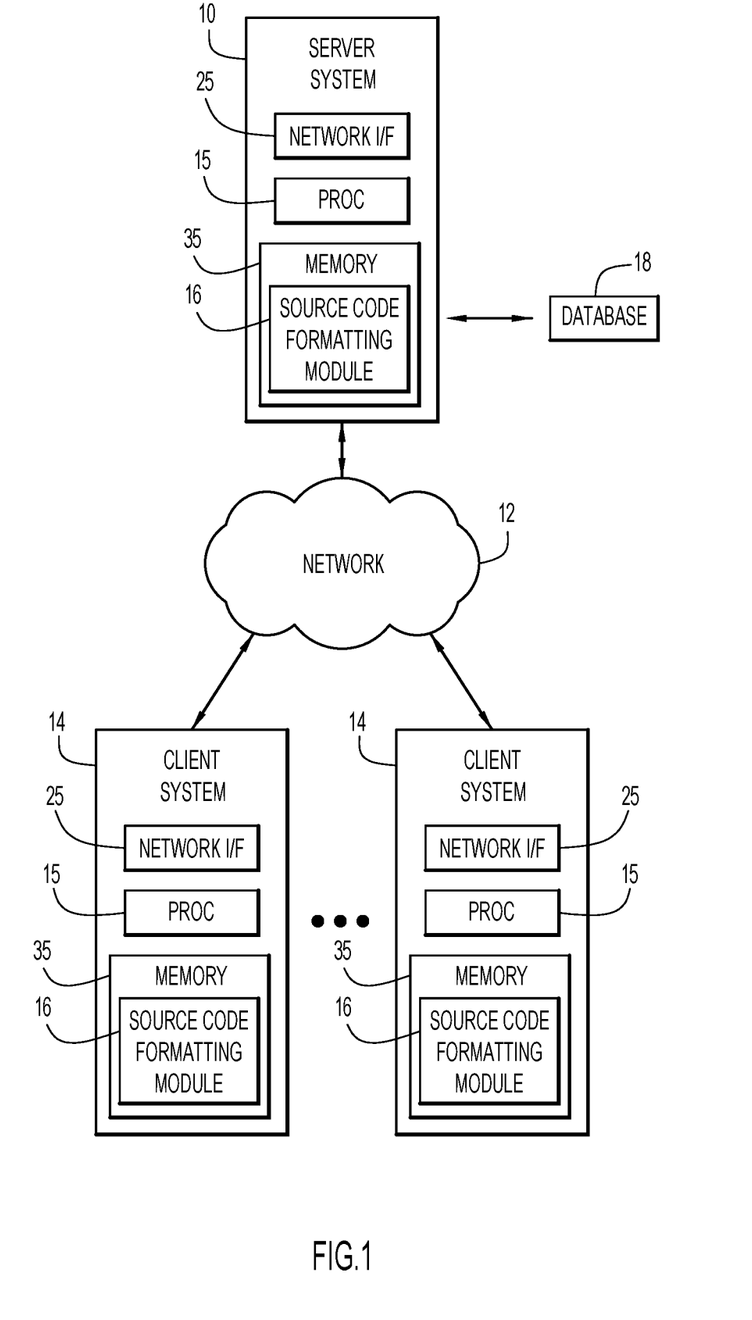
FIG. 1 is a diagrammatic illustration of an example environment for an embodiment of the present invention.

An example environment for use with present invention embodiments is illustrated in FIG. 1. Specifically, the environment includes one or more server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Client systems 14 enable users to submit documents (e.g., source code, etc.) to server systems 10 to efficiently transform a source code file for different coding formats. The server systems include a source code formatting module 16 to transform source code according to user preferences. A database system 18 may store various information to facilitate the transforming (e.g., the user preferences, a preference-neutral source code tree, etc.). The database system 18 may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the desired documents and analysis, and may provide reports including transforming results (e.g., formatted source code).

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, a source code formatting module, browser/interface software, etc.).

Alternatively, one or more client systems 14 may transform source code according to user preferences when operating as a stand-alone unit. In a stand-alone mode of operation, the client system stores or has access to the data (e.g., the user preferences, a preference-neutral source code tree, etc.), and includes source code formatting module 16. The graphical user (e.g., GUI, etc.) or other interface (e.g., command line prompts, menu screens, etc.) solicits information from a corresponding user pertaining to the preferred source code format, and may provide source code that has been formatted according to a user's preferences.

Source code formatting module 16 may include one or more modules or units to perform the various functions of present invention embodiments described below. The source code formatting module 16 may be implemented by any combination of any quantity of software and/or hardware modules or units, and may reside within memory 35 of the server and/or client systems for execution by processor 15.

Figure 2A:
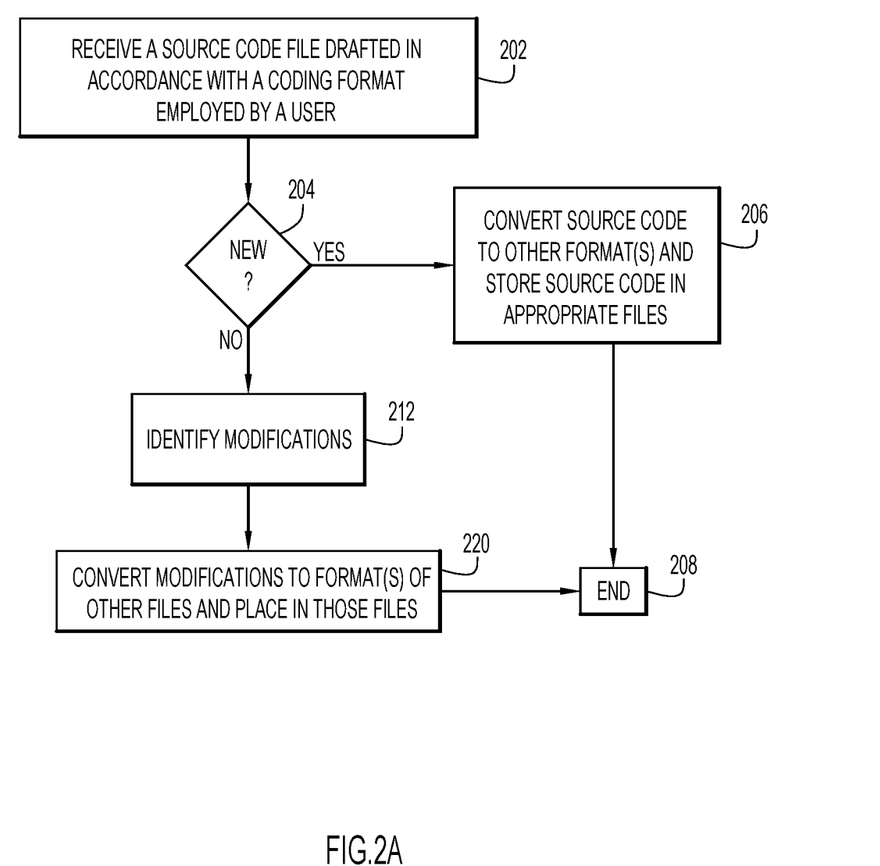
FIG. 2A is a flowchart illustrating an example manner of transforming a source code file for different coding formats while storing multiple transformed files according to an embodiment of the present invention.
Figure 2B:
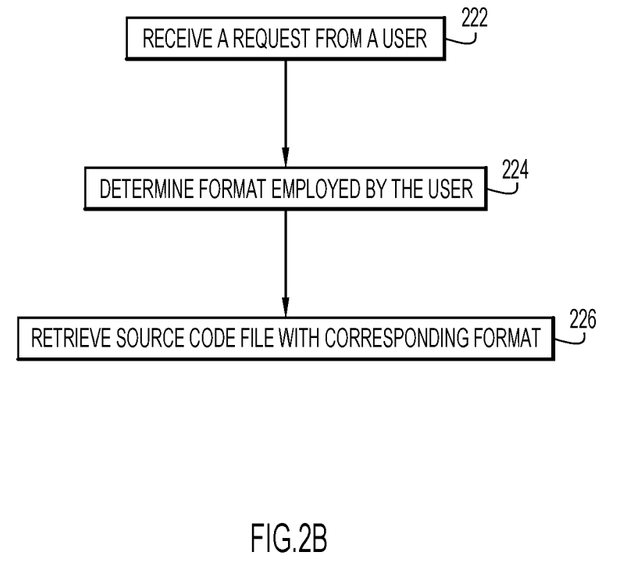
FIG. 2B is another flowchart illustrating an example manner of transforming a source code file for different coding formats while storing multiple transformed files according to an embodiment of the present invention.

The source code formatting module 16 may transform a source code file for different coding formats while storing multiple transformed files (e.g., on the database 18), as illustrated by the flowcharts of FIGS. 2A, 2B. Referring to FIG. 2A, the source code formatting module 16 initially receives a source code file drafted in accordance with a coding format employed by a user at block 202. The source code formatting module 16 determines whether the source code file is a new file (e.g., as opposed to a new/different version of a preexisting file) at block 204.

If the source code file is new, the source code formatting module 16 converts the source code to one or more other formats and stores the source code of the file in the appropriate files at block 206. For example, the source code formatting module 16 may convert the source code, which is formatted in accordance with first user preferences, to source code formats in accordance with preferences of other users. The user preferences are typically provided to the source code formatting module 16. (e.g., in the form of rule sets, etc.) In this example, the source code formatting module 16 may store each source code version (one corresponding to the first user preferences and the others corresponding to the other user preferences) in a database. After the source code versions are stored, the process ends at block 208.

If the source code file is determined to be not new (e.g., the source code file is a different version of a preexisting source code file that has counterpart versions each in a different format according to preferences of another user), the source code formatting module 16 identifies modifications in the source code file at block 212 based on a comparison with the preexisting file in the same format. A modification may be a substantive difference in the same format (as opposed to a formatting difference) between the source code file and the preexisting source code file. At block 220, the source code formatting module 16 converts the modifications in the source code file to each of the corresponding formats of the preexisting files, and places the converted modifications in the corresponding preexisting files. In other words, the preexisting files are updated with substantive changes based on the source code file, but the substantive changes are incorporated into the preexisting files in accordance with the respective formats of the preexisting files. In an embodiment, the source code file and/or updated files may be stored in a database (e.g., database 18). The process ends at block 208.

A user may subsequently retrieve a source code file in a desired format, as illustrated by the flowchart of FIG. 2B. The source code formatting module 16 receives a request for the source code file from a user at block 222. The requested source code file may be the source code file received at block 202 in FIG. 2A, or may be a modified source code file as referenced in block 220 of FIG. 2A. At block 224, the source code formatting module 16 determines the format employed by the user. In an embodiment, the format corresponding to each user may be provided at registration and be associated with a user identifier. At block 226, the requested source code file in the corresponding format is retrieved. Thus, the user may be provided with an up-to-date source code file in the format preferred by the user.

Figure 3A:
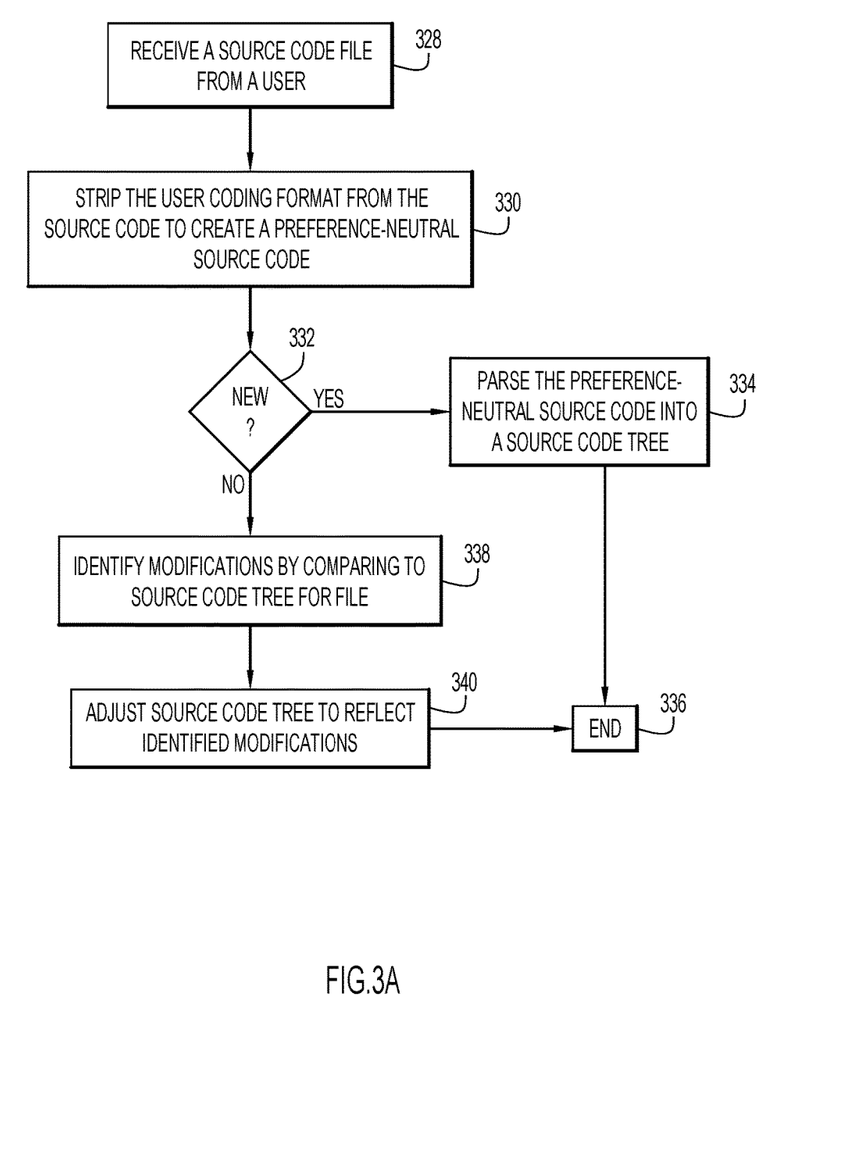
FIG. 3A is yet another flowchart illustrating an example manner of transforming a source code file for different coding formats while storing a single file according to an embodiment of the present invention.
Figure 3B:
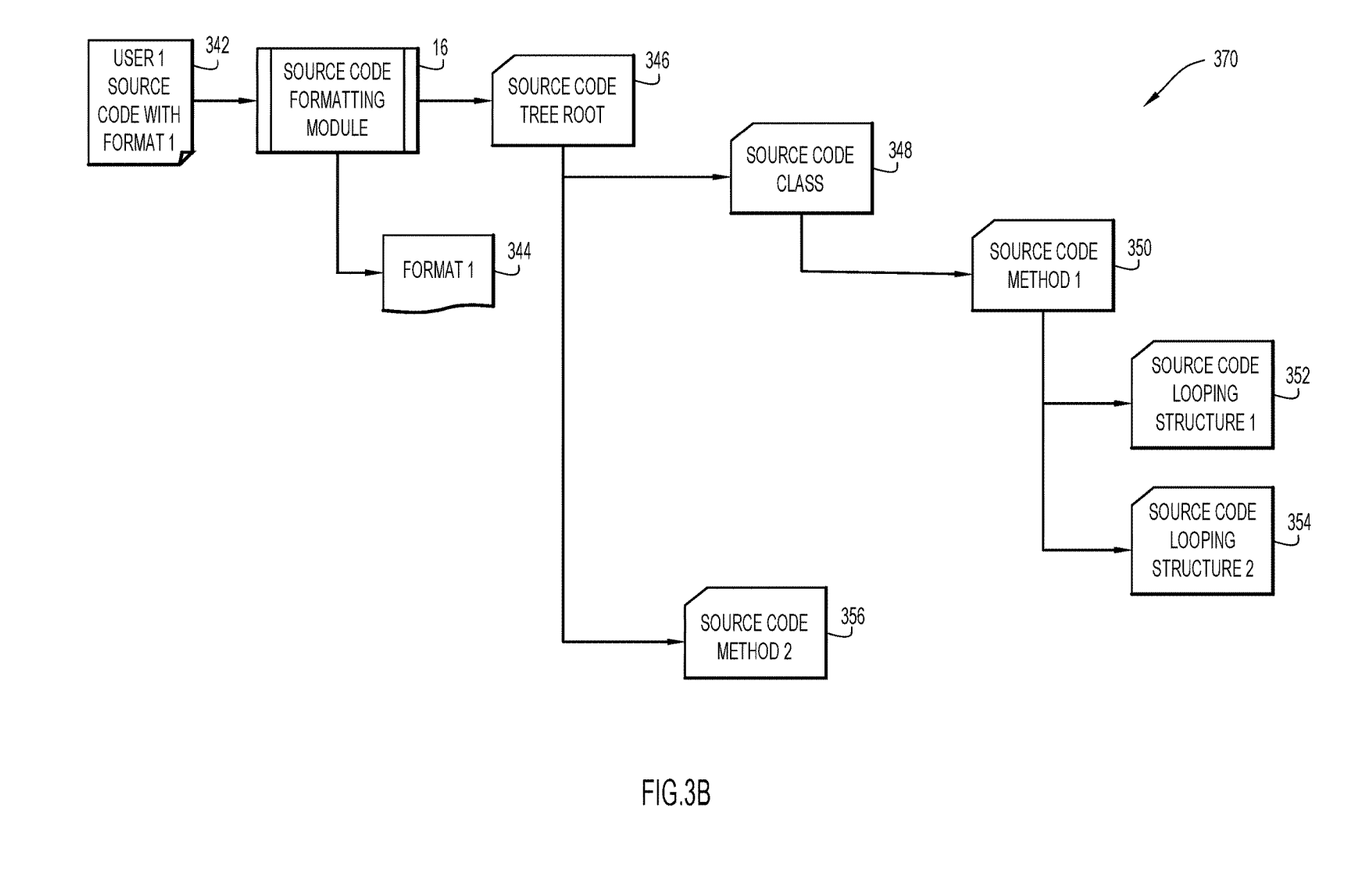
FIG. 3B is a flow diagram illustrating an example manner of parsing the preference-neutral source code into a source code tree according to an embodiment of the present invention.
Figure 3C:
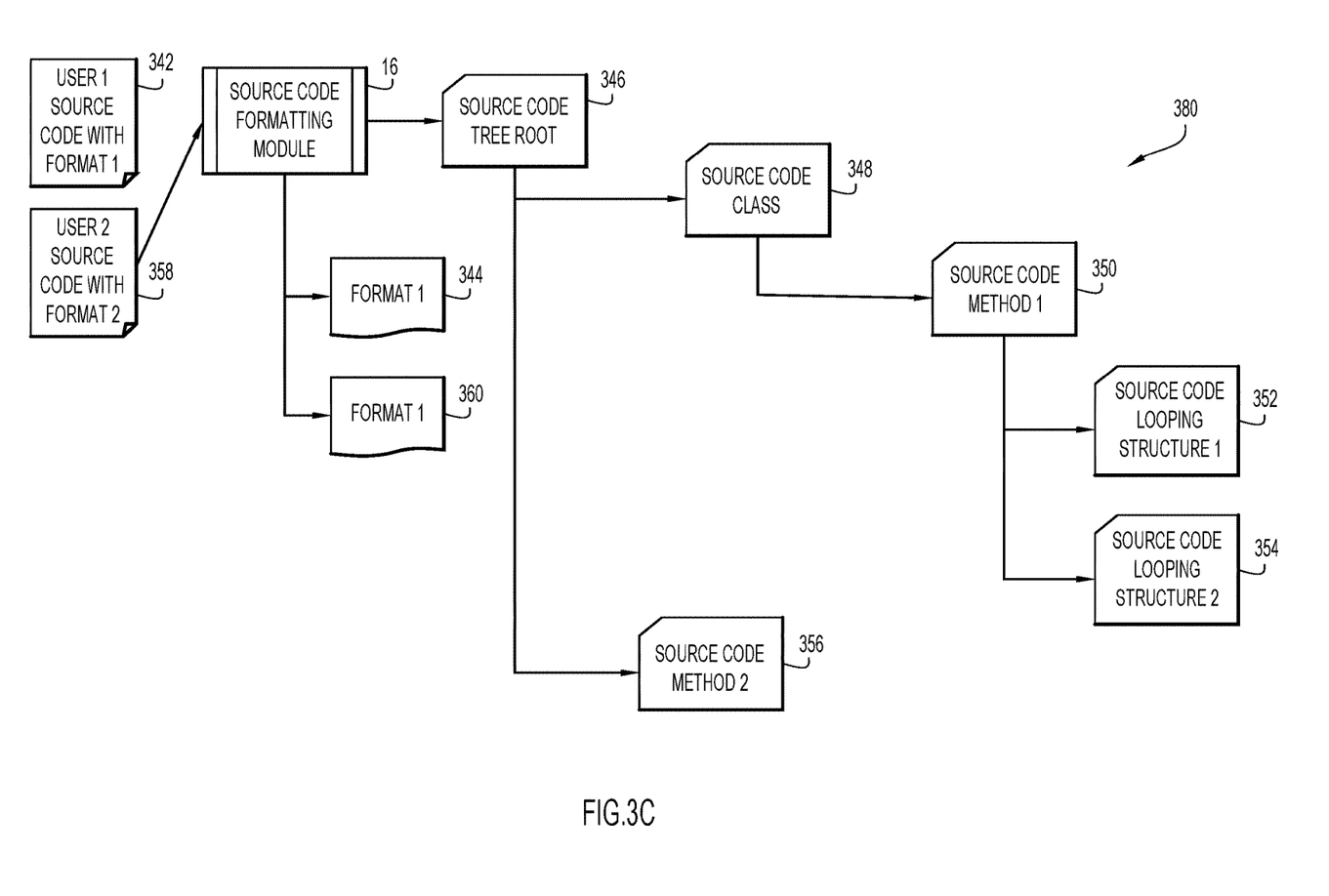
FIG. 3C is another flow diagram illustrating an example manner of identifying modifications to a source code file and adjusting the source code tree accordingly according to an embodiment of the present invention.

The source code formatting module 16 may also transform a source code file for different coding formats while storing a single file (e.g., on the database 18), as illustrated by the flowcharts of FIGS. 3A-3C. Initially, the source code formatting module 16 receives a source code file from a user at block 328. The user coding format is stripped from the source code (based on a rule set for the user coding format) to create a preference-neutral source code at block 330. At block 332, the source code formatting module 16 determines whether the received source code file is a new file (e.g., as opposed to a new/different version of a preexisting source code file).

If the received source code file is new, the source code formatting module 16 parses the preference-neutral source code file into a source code tree at block 334. In an embodiment, the source code tree may be stored in a database (e.g., database 18). The process ends at block 336.

If the received source code file is not new (e.g., the received source code file is a different version of a preexisting source code file), the source code formatting module 16 identifies modifications in the preference-neutral source code file by comparing the preference-neutral source code file to a preexisting source code tree for the file at block 338. A modification may be a substantive difference (as opposed to a formatting difference) between the preference-neutral source code file and the preexisting source code tree for the file.

After identifying the modifications, the source code formatting module 16 adjusts the source code tree to reflect the identified modifications at block 340. In other words, the preexisting source code tree is updated with substantive changes based on the preference-neutral source code file. In an embodiment, the updated/modified source code tree may be stored in a database (e.g., database 18). The process ends at block 336.

FIG. 3B is a flow diagram illustrating an example manner of parsing the preference-neutral source code into a source code tree 370 (e.g., as represented in block 334 of FIG. 3A). Initially, a first user submits a first source code file 342 having a first format 344 to the source code formatting module 16. The source code formatting module 16 strips the first format 344 from the first source code 342 to generate a first preference-neutral source code. The first preference-neutral source code is parsed into a first source code tree 370.

In this example, the source code tree includes a hierarchical structure comprising a source code tree root node 346, a source code class node 348, two source code method nodes 350, 356, and two source code looping structure nodes 352, 354. The source code class node 348 is a child of the source code tree root node 346. The first source code method node 350 is a child of the source code class node 348. The two source code looping structure nodes 352, 354 are children of the first source code method node 350. The structural arrangement indicates that the first method belongs to the source code class, and the two looping structures belong to the first method. The second source code method node 356 is a child of the source code tree root node 346.

FIG. 3C is a flow diagram illustrating an example manner of identifying modifications to a source code file and adjusting the source code tree accordingly (e.g., as represented in blocks 338, 340 of FIG. 3A). In this example, a second user submits a second source code file 358 having a second format 360 to the source code formatting module 16. The second source code file may be a modified version of the first source code file with source code modifications. The source code formatting module 16 strips the second format 360 from the second source code 358 to generate a second preference-neutral source code. The second preference-neutral source code is parsed into a second source code tree 380 having a similar structure to the first source code tree 370. The first and second source code trees 370, 380 may include any number of structures (e.g., a compiler parse structure, a document object model structure, etc.).

The source code formatting module 16 compares the first and second source code trees to identify any substantive modifications (e.g., non-formatting modifications) in the second source code tree. In particular, corresponding nodes of the source code trees are compared individually to determine whether a modification has been made to the respective nodes. In this example, the second source code looping structure 354 associated with the first source code file 342 and the second source code looping structure 354 associated with the second source code file are compared and are found to be identical. Thus, the source code formatting module 16 concludes that the second source code looping structure has not been modified.

However, the first source code looping structure 352 and the second source code method 356 were found to have been modified based on a comparison of the corresponding nodes. As a result, the source code tree 370 is adjusted to reflect the identified modifications. More specifically, the first source code looping structure node 352 and the second source code method node 356 are adjusted to reflect the modifications. The nodes of a source code tree may be adjusted by, for example, replacing a preexisting node with a subsequent node.

Figure 4A:
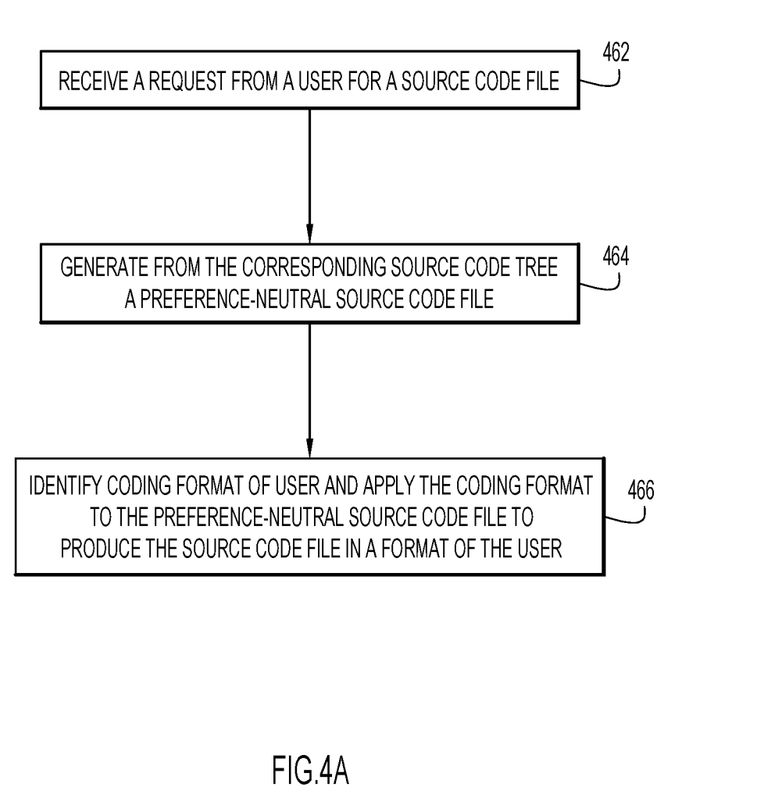
FIG. 4A is yet another flowchart illustrating an example manner of retrieving a source code file according to an embodiment of the present invention.

A user may subsequently retrieve a source code file, as illustrated by the flowchart of FIG. 4A. Initially, at block 462, the source code formatting module 16 receives a request from a user for a source code file. In response to the request, the source code formatting module 16 generates a preference-neutral source code file from the corresponding source code tree of the requested source code file at block 464. The preferred coding format of the user (e.g., rule-set, etc.) is applied to the preference-neutral source code file in order to produce the source code file in the preferred user format at block 466. Thus, the user may be provided with an up-to-date source code file in the format preferred by the user.

Figure 4B:
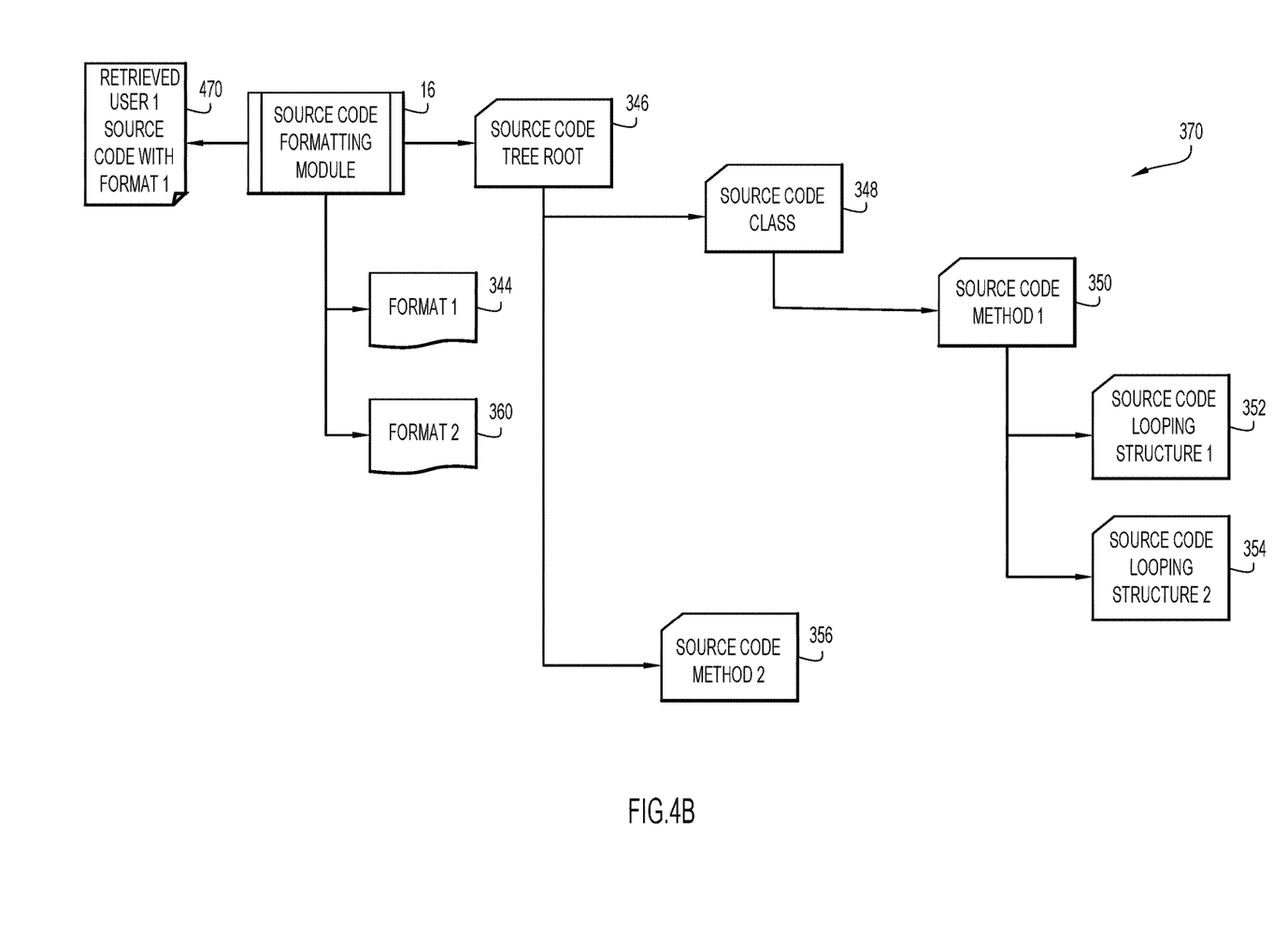
FIG. 4B is yet another flow diagram illustrating an example manner of retrieving a source code file according to an embodiment of the present invention.

FIG. 4B is a flow diagram illustrating an example embodiment of retrieving a source code file (e.g., as represented by the flowchart of FIG. 4A). The following description may occur after a source code tree has been updated (e.g., after the flow diagram of FIG. 3C is implemented). The first user submits a request to the source code formatting module 16 for a source code file in a first user format 344. The source code formatting module 16 retrieves a source code tree corresponding to the requested source code file (the source code tree may be similar to the source code tree described in conjunction with FIGS. 3B, 3C). Based on the source code tree, the source code formatting module 16 generates a preference-neutral source code file. The preferred user format 344 for the first user is applied to the preference-neutral source code file, and the source code 470, having format 344, is retrieved. Thus, the first user may be provided with an up-to-date source code file 470 in the format 344 preferred by that user.

Parsing source code documents into a source code tree structure improves the processing speed at which the source code formatting module 16 performs the processes described herein. Specifically, utilizing a source code tree structure enables the source code formatting module 16 to compare respective individual nodes of the source code tree structure instead of, for example, the respective source code files as a whole. This allows the source code formatting module 16 to efficiently perform many (e.g., hundreds or thousands) small comparisons between respective nodes.

It will be appreciated that the embodiments described above and illustrated in the drawings represent only a few of the many ways of implementing embodiments for transforming a source code file for different coding formats.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, source code formatting module 16, etc.). These systems may include any types of monitors and input devices (e.g., keyboard, mouse, voice recognition, etc.) to enter and/or view information.

It is to be understood that the software (e.g., source code formatting module 16) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., source code formatting module 16) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., the user's preferences, a preference-neutral source code tree, etc.). The database system may be implemented by any number of any conventional or other databases, data stores or storage structures (e.g., files, databases, data structures, data or other repositories, etc.) to store information (e.g., the user's preferences, a preference-neutral source code tree, etc.). The database system may be included within or coupled to the server and/or client systems. The database systems and/or storage structures may be remote from or local to the computer or other processing systems, and may store any desired data (e.g., the user's preferences, a preference-neutral source code tree, etc.).

The present invention embodiments may employ any number of any type of user interface (e.g., Graphical User Interface (GUI), command-line, prompt, etc.) for obtaining or providing information (e.g., the user's source code formatting preferences), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., source code that is transformed according to a user's preferences, etc.).

The present invention embodiments are not limited to the specific tasks or algorithms described above, but may be utilized for transforming source code of any type (e.g., C++, Java, etc.) using any type(s) of one or more operating system(s).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of transforming a source code file for different coding formats comprising:
   generating a source code file in accordance with a first coding format employed by a first user, wherein generating the source code file comprises:
   converting the source code file to a preference-neutral source code file by stripping the first coding format from the source code file;
   parsing the preference-neutral source code file into a first plurality of elements of a first tree structure; and
   storing the first tree structure in a repository;
   in response to a request for the generated source code file from a second user employing a different coding format: transforming the generated source code file to the different coding format employed by the second user;
   presenting the transformed source code file to the second user in the different coding format;
   receiving changes by the second user to the source code file in the different coding format;

converting the source code file in the different coding format to a second preference-neutral source code file by stripping the different coding format from the source code file;

parsing the second preference-neutral source code file into a second plurality of elements of a second tree structure;

retrieving the first tree structure from the repository and comparing each of the first plurality of elements of the first tree structure to the second plurality of elements of the second tree structure to identify substantive modifications in the second plurality of elements, wherein a substantive modification is identified when comparing an element of the first plurality of elements to a corresponding element of the second plurality of elements indicates a difference in content between the compared elements, and wherein the first and second tree structures include a document object model; and applying the substantive modifications to the first tree structure to modify the source code file.

2. The method of claim 1, wherein:

generating the source code file includes converting the generated source code file to a format of the repository and storing the converted source code file in the repository; and transforming the generated source code file includes retrieving the converted source code file from the repository and transforming the converted source code file to the different coding format employed by the second user.

3. The method of claim 1, further comprising:

generating a second source code file in each of one or more different coding formats employed by one or more corresponding users; and transforming the generated second source code file for the second user by retrieving the second source code file corresponding to the different coding format employed by the second user.

4. A system for transforming a source code file for different coding formats comprising:

a computer system including at least one processor configured to:

generate a source code file in accordance with a first coding format employed by a first user, wherein generating the source code file comprises:

converting the source code file to a preference-neutral source code file by stripping the first coding format from the source code file;

parsing the preference-neutral source code file into a first plurality of elements of a first tree structure; and storing the first tree structure in a repository;

in response to a request for the generated source code file from a second user employing a different coding format:

transform the generated source code file to the different coding format employed by the second user;

present the transformed source code file to the second user in the different coding format;

receive changes by the second user to the source code file in the different coding format;

convert the source code file in the different coding format to a second preference-neutral source code file by stripping the different coding format from the source code file;

parse the second preference-neutral source code file into a second plurality of elements of a second tree structure;

retrieve the first tree structure from the repository and compare each of the first plurality of elements of the first tree structure to the second plurality of elements of the second tree structure to identify substantive modifications in the second plurality of elements, wherein a substantive modification is identified when comparing an element of the first plurality of elements to a corresponding element of the second plurality of elements indicates a difference in content between the compared elements, and wherein the first and second tree structures include a document object model; and apply the substantive modifications to the first tree structure to modify the source code file.

5. The system of claim 4, wherein:

generating the source code file includes converting the generated source code file to a format of the repository and storing the converted source code file in the repository; and transforming the generated source code file includes retrieving the converted source code file from the repository and transforming the converted source code file to the different coding format employed by the second user.

6. The system of claim 4, wherein the at least one processor is further configured to:

generate a second source code file in each of one or more different coding formats employed by one or more corresponding users; and transform the generated second source code file for the second user by retrieving the second source code file corresponding to the different coding format employed by the second user.

7. A computer program product for transforming a source code file for different coding formats comprising:

a computer readable storage medium having computer readable program code embodied therewith, the computer readable program code, when executed by a processor, causes the processor to:

generate a source code file in accordance with a first coding format employed by a first user, wherein generating the source code file further comprises:

converting the source code file to a preference-neutral source code file by stripping the first coding format from the source code file;

parsing the preference-neutral source code file into a first plurality of elements of a first tree structure; and storing the first tree structure in a repository;

in response to a request for the generated source code file from a second user employing a different coding format:

transform the generated source code file to the different coding format employed by the second user;

present the transformed source code file to the second user in the different coding format;

receive changes by the second user to the source code file in the different coding format;

convert the source code file in the different coding format to a second preference-neutral source code file by stripping the different coding format from the source code file;

parse the second preference-neutral source code file into a second plurality of elements of a second tree structure;

retrieve the first tree structure from the repository and compare each of the first plurality of elements of the first tree structure to the second plurality of elements of the second tree structure to identify substantive modifications in the second plurality of elements, wherein a substantive modification is identified when comparing an element of the first plurality of elements to a corresponding element of the second plurality of elements indicates a difference in content between the compared elements, and wherein the first and second tree structures include a document object model; and apply the substantive modifications to the first tree structure to modify the source code file.

8. The computer program product of claim 7, wherein:

generating the source code file includes converting the generated source code file to a format of the repository and storing the converted source code file in the repository; and transforming the generated source code file includes retrieving the converted source code file from the repository and transforming the converted source code file to the different coding format employed by the second user.

9. The computer program product of claim 7, wherein the computer readable program code further causes the processor to:

generate a second source code file in each of one or more different coding formats employed by one or more corresponding users; and transform the generated second source code file for the second user by retrieving the second source code file corresponding to the different coding format employed by the second user.

\* \* \* \* \*